(12) United States Patent
Saffman et al.

(10) Patent No.: US 11,997,780 B2
(45) Date of Patent: May 28, 2024

(54) VACUUM CELL WITH ELECTRIC-FIELD CONTROL

(71) Applicant: ColdQuanta, Inc., Boulder, CO (US)

(72) Inventors: Mark Saffman, Madison, WI (US); Thomas William Noel, Lafayette, CO (US); Steven Michael Hughes, Louisville, CO (US)

(73) Assignee: ColdQuanta, Inc., Boulder, CO (US)

( * ) Notice: Subject to any disclaimer, the term of this patent is extended or adjusted under 35 U.S.C. 154(b) by 363 days.

(21) Appl. No.: 17/340,039

(22) Filed: Jun. 6, 2021

(65) Prior Publication Data

US 2021/0410266 A1 Dec. 30, 2021

Related U.S. Application Data

(60) Provisional application No. 63/044,571, filed on Jun. 26, 2020.

(51) Int. Cl.
*H05H 3/04* (2006.01)
*G06N 10/00* (2022.01)

(52) U.S. Cl.
CPC .............. *H05H 3/04* (2013.01); *G06N 10/00* (2019.01); *H05H 2242/00* (2013.01)

(58) Field of Classification Search
CPC ...... H05H 3/04; H05H 2242/00; G06N 10/00; G06N 10/20; G06N 10/40
See application file for complete search history.

(56) References Cited

U.S. PATENT DOCUMENTS

| | | | |
|---|---|---|---|
| 9,117,563 B2 | 8/2015 | Hughes | |
| 9,701,581 B2 | 7/2017 | Kangastupa | |
| 9,960,025 B1 * | 5/2018 | Hughes | F04B 37/14 |
| (Continued) | | | |

FOREIGN PATENT DOCUMENTS

| | | |
|---|---|---|
| EP | 2505297 | 8/2016 |
| TW | I545662 | 8/2016 |

OTHER PUBLICATIONS

Lee et al., Sealing Success: Developing a Photonics Packaging Company, Aug. 26, 2020.

(Continued)

*Primary Examiner* — David A Vanore
(74) *Attorney, Agent, or Firm* — Van Pelt, Yi & James LLP; Clifton Leon Anderson

(57) ABSTRACT

A vacuum cell provides for electric field control within an ultra-high vacuum (UHV) for cold-neutral-atom quantum computing and other quantum applications. Electrode assemblies extend through vacuum cell walls. Prior to cell assembly, contacts are bonded to respective locations on the ambient-facing surfaces of the walls. Trenches are formed in the vacuum-facing surfaces of walls and via holes are formed, extending from trenches through the wall and into the contacts. Plating conductive material into the trenches and via holes forms the electrodes and vias. The electrodes are contained by the trenches and do not extend beyond the trenches so as to avoid interfering with the bonding of components to the vacuum-facing surfaces of the walls. The vias extend into the contacts to ensure good electrical contact. An electric-field controller applies electric potentials to the electrodes (via the contacts) to control electric fields within the vacuum.

24 Claims, 8 Drawing Sheets

(56) References Cited

U.S. PATENT DOCUMENTS

| | | | |
|---|---|---|---|
| 10,629,417 B1* | 4/2020 | Hughes | G05B 19/048 |
| 10,755,831 B2* | 8/2020 | Anderson | G01V 7/00 |
| 11,150,609 B1* | 10/2021 | Parazzoli | H01J 49/424 |
| 11,257,605 B2* | 2/2022 | Anderson | G01C 19/58 |
| 11,320,588 B1* | 5/2022 | Mazed | G16H 10/40 |
| 11,397,085 B1* | 7/2022 | Anderson | G01C 19/58 |
| 11,415,614 B2* | 8/2022 | Salim | G01R 29/0885 |
| 11,592,469 B2* | 2/2023 | Anderson | G01R 29/10 |
| 11,733,655 B2* | 8/2023 | Salim | G04F 5/14 |
| | | | 331/94.1 |
| 11,776,797 B2* | 10/2023 | Hughes | H01J 41/12 |
| | | | 417/48 |
| 2007/0001579 A1 | 1/2007 | Jeon | |
| 2010/0213367 A1 | 8/2010 | Miller | |
| 2011/0186728 A1 | 8/2011 | Franzen | |
| 2013/0344302 A1 | 12/2013 | Hélie | |
| 2014/0218802 A1 | 8/2014 | Saito | |
| 2015/0259816 A1 | 9/2015 | Minsek | |
| 2016/0308543 A1 | 10/2016 | Ishihara | |
| 2017/0133210 A1 | 5/2017 | Tanaka | |
| 2018/0212612 A1 | 7/2018 | Park | |
| 2018/0233337 A1 | 8/2018 | Hughes | |
| 2018/0233338 A1 | 8/2018 | Hughes | |
| 2018/0351116 A1 | 12/2018 | Wada | |
| 2019/0027355 A1 | 1/2019 | Kim | |
| 2019/0109597 A1 | 4/2019 | Matsuda | |
| 2019/0293923 A1 | 9/2019 | Ghahremani | |
| 2019/0322577 A1 | 10/2019 | Dussauze | |
| 2021/0335591 A1 | 10/2021 | Kim | |
| 2021/0410266 A1* | 12/2021 | Saffman | H05H 3/04 |
| 2022/0084709 A1* | 3/2022 | Hughes | G06N 10/40 |
| 2022/0196716 A1* | 6/2022 | Anderson | G01R 29/10 |
| 2022/0262609 A1* | 8/2022 | Hughes | H01J 41/12 |
| 2022/0291268 A1* | 9/2022 | Anderson | G01R 29/0878 |
| 2023/0246117 A1* | 8/2023 | Hughes | G02F 2/00 |
| | | | 257/9 |

OTHER PUBLICATIONS

Vrijsen et al., Efficient Isotope-Selective Pulsed Laser Ablation Loading of 174Yb+ Ions in a Surface Electrode Trap, Research Article, Optics Express, vol. 27, No. 23, Nov. 11, 2019, Optics Express 33907.

Watanabe et al., Direct Joining of Glass Substrates by 1kHz Femtosecond Laser Pulses, Applied Physics B, Laser and Optics, Appl. Phys. B 87, pp. 85-89, 2007.

Hofmann et al., An Experimental Approach for Investigating Many-Body Phenomena in Rydberg-Interacting Quantum Systems, Jul. 3, 2013.

\* cited by examiner

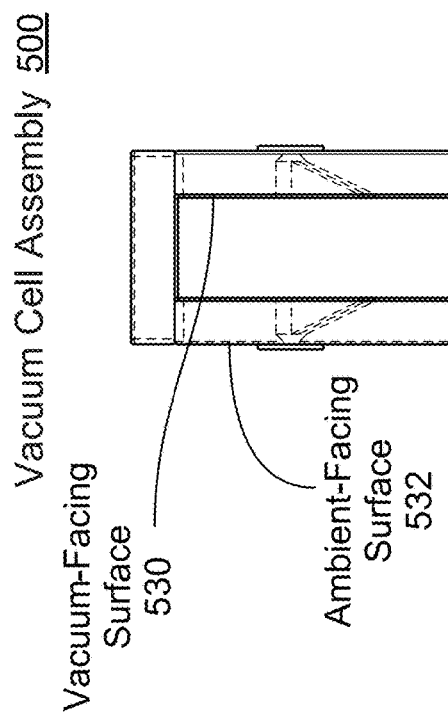
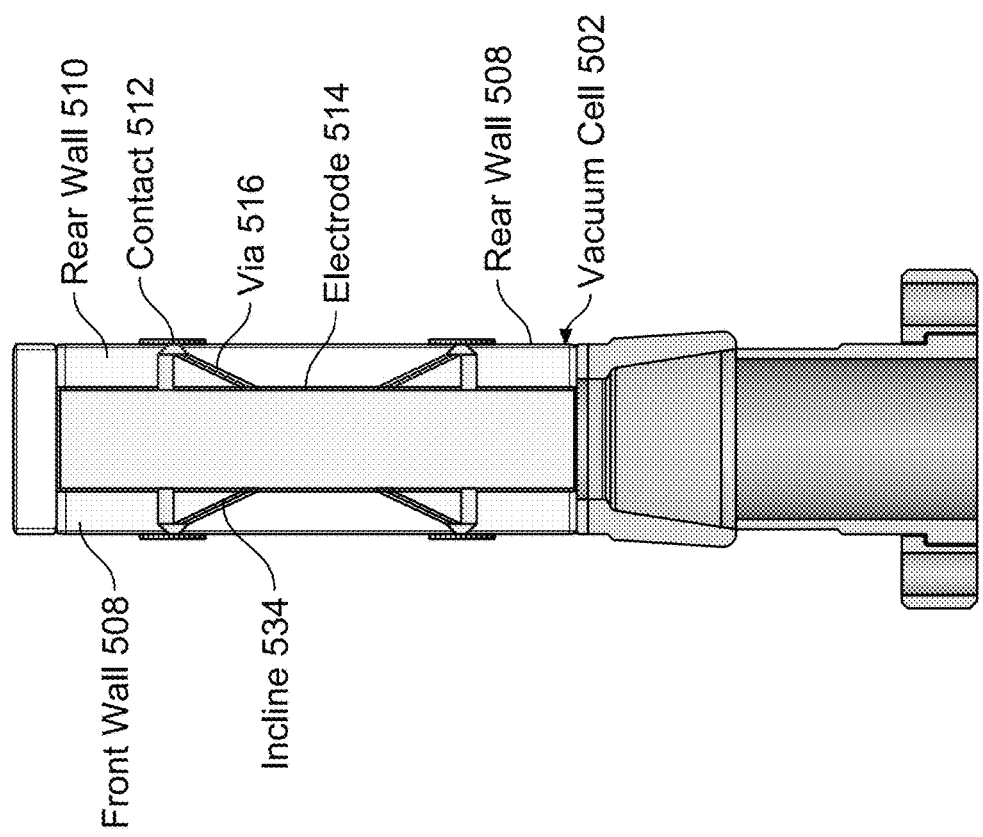
FIG. 6B
FIG. 6A

VACUUM CELL WITH ELECTRIC-FIELD CONTROL

BACKGROUND

Quantum computation, quantum networking, and quantum sensing with atomic particles, including neutral atoms, charged ions, and charged and neutral molecules, typically require a population of quantum particles confined to an ultra-high vacuum (UHV) cell so that they are isolated from ambient particles and so as to minimize collisions between particles in the population. In many cases, the cell is shielded from stray electric and magnetic fields that might otherwise interfere with intended operations on the particles.

BRIEF DESCRIPTION OF THE DRAWINGS

FIG. 6A is a gray-scale right side elevation view of the vacuum cell assembly of FIG. 5A.

FIG. 6B is a left side elevation view of the vacuum cell assembly of FIG. 5A.

DETAILED DESCRIPTION

Figure 1:
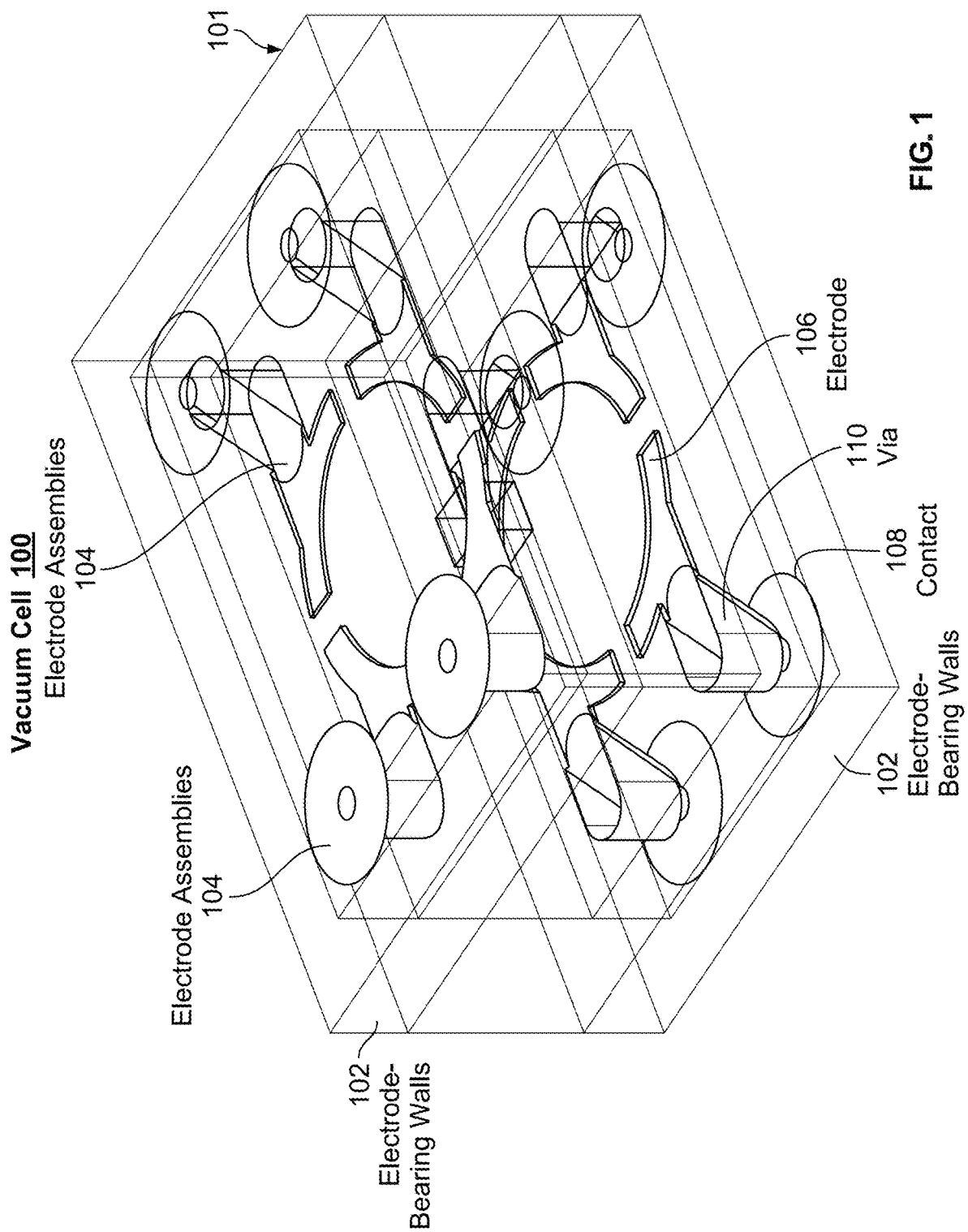
FIG. 1 is an isometric illustration of a vacuum cell with electrode assemblies.

An electric-field distribution in a target region of a vacuum cell can be controlled as a function of the electric potentials of electrodes formed on or in vacuum-facing surfaces of cell walls. The electric field control can be used to cancel unwanted electric fields at the target region and/or be used to intentionally apply electric fields to enhance control over quantum particles.

External access to the electrodes is available via contacts bonded to ambient-facing surfaces of the cell boundary structure (e.g., walls) and vias that extend from the electrodes through the boundary structure and to or into the contacts. Thus, an electric field controller can control an electric field distribution in the target region through the controller's connection to the contacts, vias, and electrodes. The electrodes, vias, and contacts can be placed at the "outskirts" of the target region to allow optical, radio frequency (RF), e.g., microwave, access to quantum particles, e.g., atoms, in the target region.

Each electrode can be formed within a trench in a cell wall so that it does not extend beyond the trench. Thus, the electrodes do not interfere with anodic or other contact bonding of the vacuum-facing surface of the respective wall to components or to other walls. As a result, a more compact vacuum cell can be made since there is no need to leave tolerances between electrodes and other components; in fact, components can be bonded over the flush or recessed electrodes. In addition, the flush or recessed electrodes do not interfere with line-of-sight processes that can be used to fabricate the vacuum cell. The vias can extend through respective walls and into respective contacts to ensure good electrical connections with the contacts.

In neutral-atom quantum computing, qubits can be encoded using states that are insensitive to the background electromagnetic environment. This insensitivity imbues neutral atoms with relatively long coherence times even in the presence of electromagnetic field fluctuations. However, during atom qubit-state preparation, measurement, and gate operations, other electronic states of the atoms can be accessed that increase sensitivity to variation and noise in the electromagnetic environment.

For example, neutral atom quantum computation architectures can rely on transiently populating Rydberg states (states with highly excited principal quantum number, $n \gg 1$) for multi-qubit gate implementation; in this case, the sensitivity of the Rydberg states to electric fields can be dominant as polarizabilities (and therefore energy shifts in the presence of an electric field) of Rydberg states is proportional to $n^7$ at high n. Thus, spatial and temporal variation in an electric field across the atomic qubit register can lead to spatially and temporally varying optimal hardware parameters for gate operations and impacts system performance. The larger the number of atoms the larger the physical volume of the register and the more important and difficult the electromagnetic control problem becomes. While the invention is applicable to qubit registers with any number of atoms, e.g., 40 or more, it is increasingly important for registers with 60 or more atoms, and possibly essential for registers with 100 or more atoms.

Since the orientation of stray fields at an atom population, e.g., in a qubit register, can be unpredictable and time-varying, full three-dimensional field control is desired. Furthermore, stray fields can have non-negligible gradients over the spatial extent of an atom population. For this reason, control over both electric field strength and electric-field gradients can be required. Electric field control can also address performance degradations due to stray fields in the context of other quantum applications such as quantum networking and quantum sensing.

The approach described herein places the atom population into a target region of active electric field control by integrating active field control elements with the ultra-high vacuum and optical access elements. This approach not only provides the required active field control but also meets all other requirements for neutral atom quantum applications, including ultra-high vacuum, a high degree of optical access, and the desire to interrogate the atom population with oscillating electric and magnetic fields in the radio and microwave frequency ranges.

As shown in FIG. 1, a vacuum cell 100 includes a boundary structure 101 having electrode-bearing walls 102. Electrode bearing walls 102 collectively host eight electrode assemblies arranged at the vertices of a cube or rectangular parallelepiped. Each electrode assembly 104 includes a vacuum facing electrode 106, an ambient-facing contact 108, and a via 110 electrically connecting the respective electrode to the respective contact. The electrodes of a wall are arranged around a circumference so as to define a circular window that provides optical, microwave, and radio-frequency access to a central target region. Electrical potentials at each electrode 106 can be controlled from outside vacuum cell 100 by applying the corresponding electrical potentials to the respective contacts. Independently controlling the electrical potentials of the eight electrodes allows three-dimensional control of electric fields (magnitudes and gradients) within an interior target region of cell 100.

Figure 2:
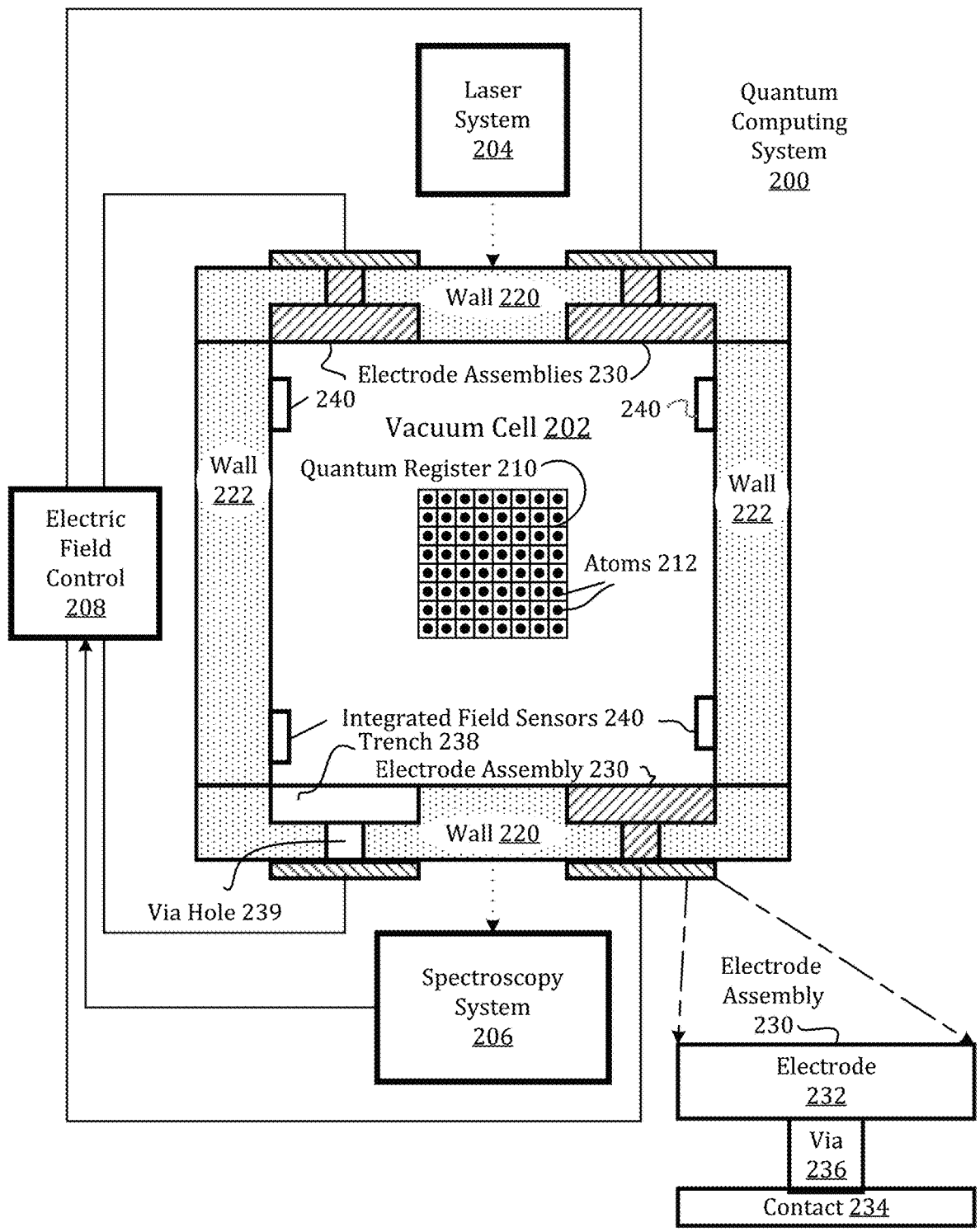
FIG. 2 is a schematic drawing of a quantum computing system.

As shown in FIG. 2, a quantum computer system 200 includes a vacuum cell 202, a laser system 204, a spectroscopy system 206, and an electric-field controller 208. Vacuum cell 202 maintains an ultra-high vacuum (UHV) of less than $10^{-9}$ Torr over a volume of 100 milliliters (mL) or less, suitable for containing a quantum register 210 populated with atomic particles 212, e.g., cesium atoms. Cell 202 includes opposing walls 220 and opposing walls 222 bonded to opposing walls 220. Opposing walls 220 serve as sites for electrode assemblies 230. Each electrode assembly 230 includes a vacuum-facing electrode 232, an ambient-facing contact 234, and a conductive via 236 electrically coupling the respective electrode to the respective contact. Via 236 extends into contact 234 to ensure a reliable electrical connection. Likewise, in FIG. 1, each via 110 extends into the respective contact 108 to ensure a reliable electrical connection. (In FIG. 2, one electrode assembly is omitted for the expository purpose of allowing identification of a trench 238 and a via hole 239.)

Laser system 204 is used to: form an optical lattice that defines quantum register 210; transport atoms to populate the optical lattice; establish initial states for the atoms, and to implement gate operations. Spectroscopy (and imaging) system 206 is used to readout computational results, detect atom vacancies in quantum register 210, and to capture spectrographic measurements of shifts and splittings of atomic energy levels to characterize the electric field at the qubit register. Electric field control 208 can then adjust the electrical potentials it applies to electrode assemblies 230 based on these spectrographic measurements to offset undesirable static or time-varying electric field components. In addition, integrated field sensors 240 can provide on-going electric-field characterizations to electric field control 208 for this purpose. The electric field sensors can be integrated into electrode assemblies or located separately.

In the context of Rydberg-based quantum computing, the controllable non-zero electric field enabled in quantum computing system 200 can be used to tune the interaction strength of Rydberg-Rydberg interactions. Thus, static or dynamic control over the background electric field enables control over the magnitude and range of the interactions that underlie multi-qubit gate operations and can therefore provide control over a tradeoff between connectivity distances and degree of gate parallelization achieved by a quantum processor. Providing this electric field control on short timescales, on the order of the timescale for the quantum operations themselves, allows dynamic reconfigurability of the quantum processor topology.

Figure 3A:
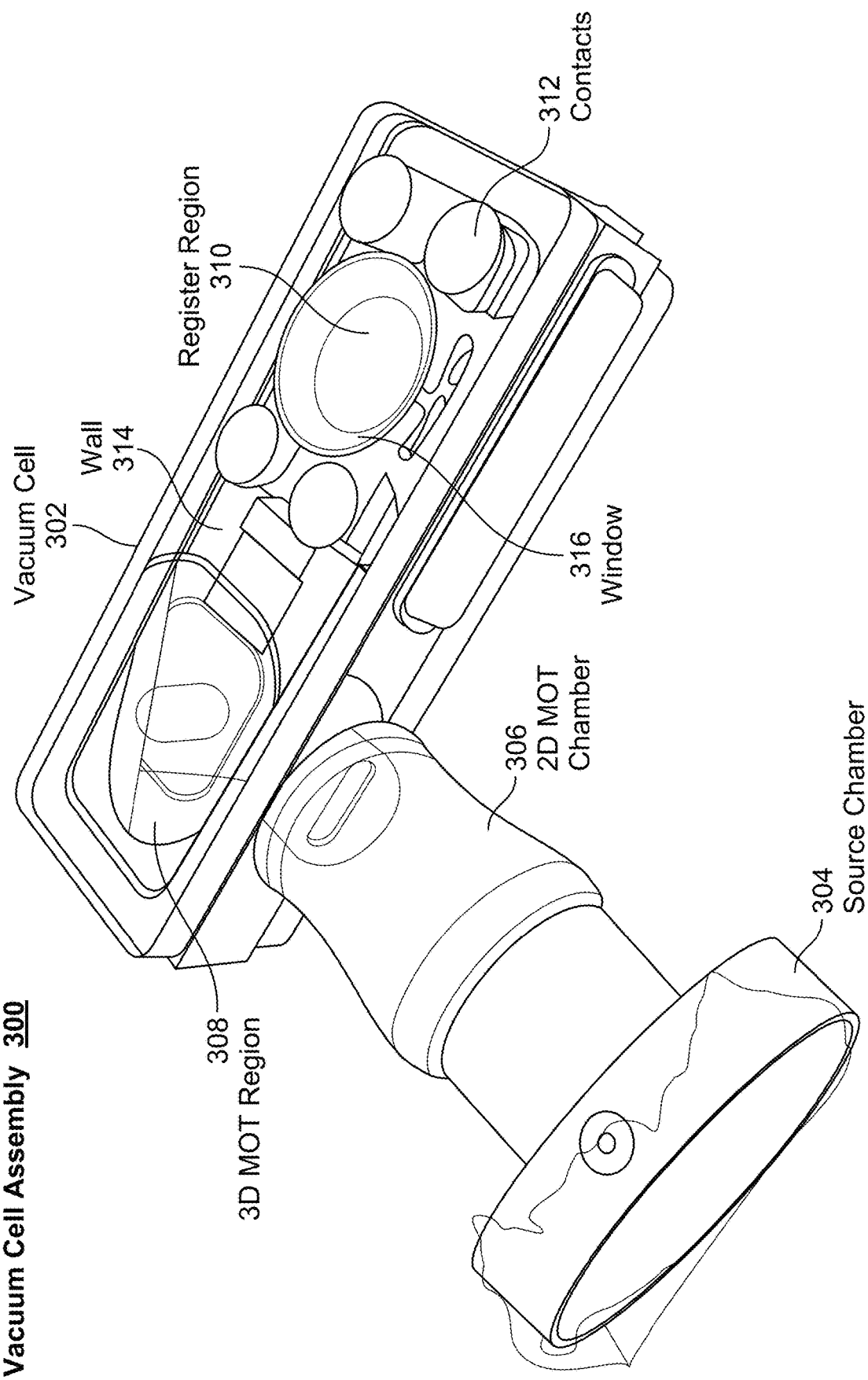
FIG. 3A is a photograph of a vacuum cell assembly used for quantum computing.

As shown in FIG. 3A, a vacuum cell assembly 300 includes a vacuum cell 302, a cesium source chamber 304 and a two-dimensional magneto-optical-trap (2D MOT) chamber 306. In use, cesium 133 ($^{133}$Cs) atoms from source chamber 302 are cooled by the 2D MOT and guided to a three-dimensional (3D) MOT in a 3D MOT region 308 of vacuum cell 302. The 3D MOT further cools the $^{133}$Cs atoms and serves as a reservoir of the atoms for populating a quantum register. From the 3D MOT, $^{133}$Cs atoms can be transported, e.g., using an optical conveyor belt and/or optical tweezers, to populate the quantum register in quantum register region 310. Four contacts 312 of respective electrode assemblies are shown bonded to an ambient-facing surface of wall 314 of cell 302; the associated electrodes help define a circular window 316 in wall 314.

Figure 3B:
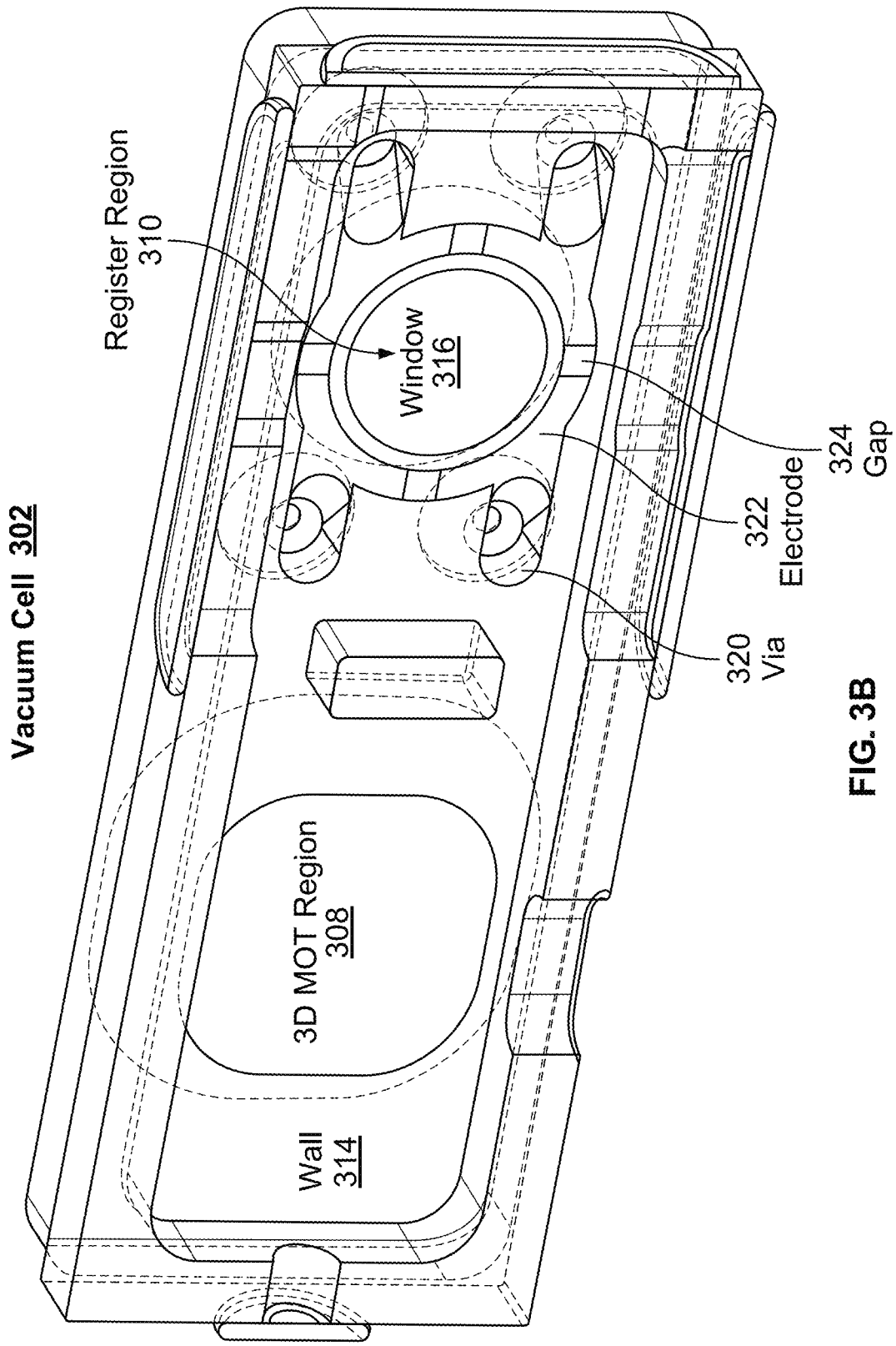
FIG. 3B is a drawing showing some of the interior of the vacuum cell of FIG. 3A.

FIG. 3B is a view of the interior of vacuum cell 302 showing vias 320 and electrodes 322. Electrodes 322 are separated by gaps 324, e.g., regions of wall 314 that were not removed to form trenches for electrodes 322. These gaps 324 serve to electrically isolate electrodes 322 from each other so that their respective electrical potentials can be set independently. Electrodes 322 are flush or slightly recessed with respect to wall 314 and gaps 324 to avoid interfering with any contact bonding required to assemble and hermetically seal cell 302 or required to mount components onto wall 314. Note that vias 320 are plated to form hollow cone-shaped conductors. Vacuum cell 302 has an interior volume less than 500 mL. Eight electrodes 322 are located at the vertices of a rectangular parallelepiped that encloses a volume of less than 100 mL.

The embodiments of FIGS. 1-3B meet requirements for spatial uniformity of the electric field for cold atom quantum computing, networking, and sensing; these requirements may be stricter than those for zeroing the absolute magnitude of the field. For example, variations of less than ten microvolts per centimeter (10 uV/cm) and cancellation of an electric field to less than 1 mV/cm are achieved for regions of several millimeters in each direction, which is sufficient, for example, for a qubit register. The electric field uniformity achieved suffices to keep Stark shift variation below one kilohertz (1 kHz) is typically of order $0.01(100/n)^{7/2}$ mV/cm.

Figure 4:
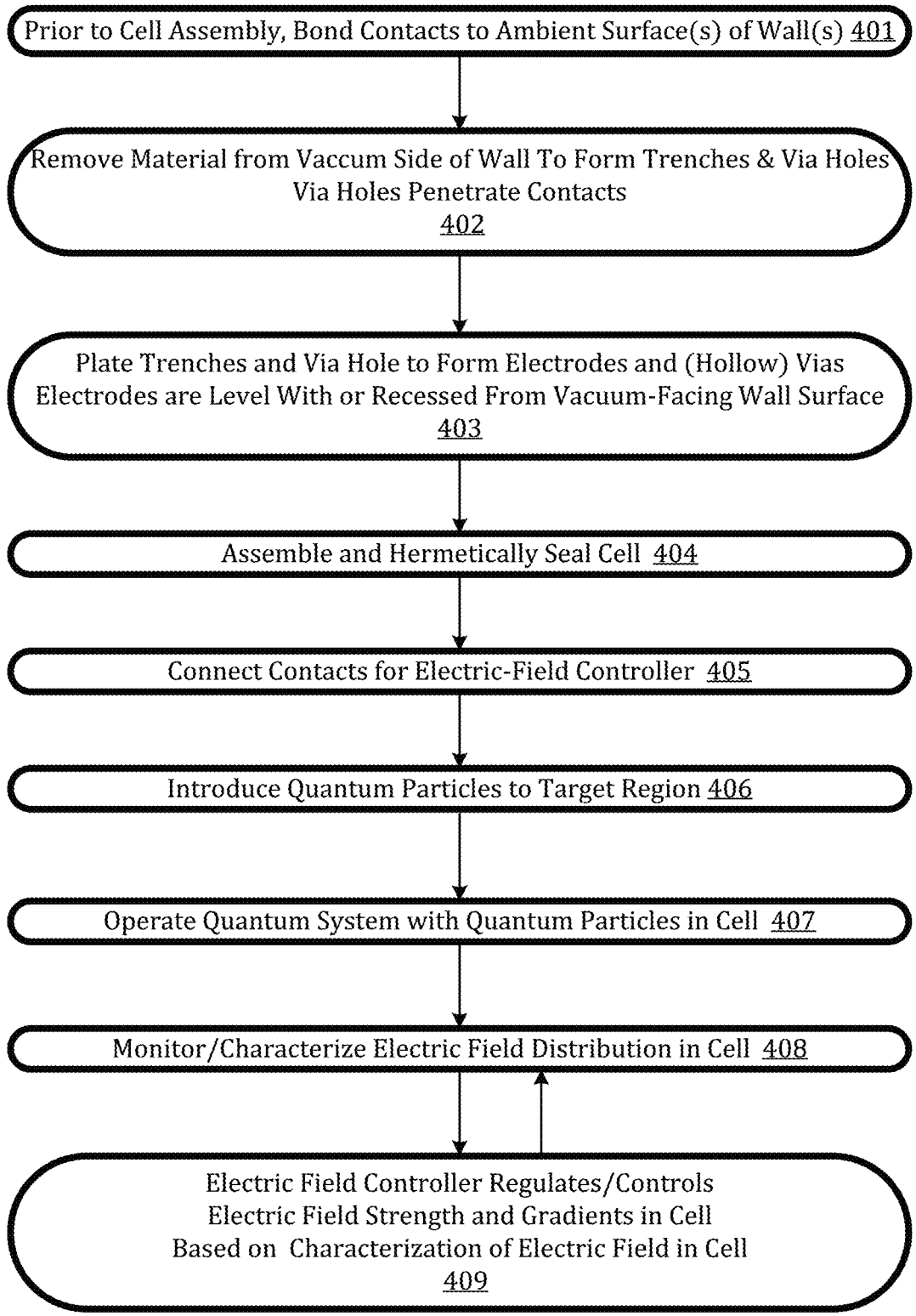
FIG. 4 is a flow chart of an electric-field control process implementable in the system of FIGS. 3A and 3B and in other systems.

An electric-field control process 400, flow-charted in FIG. 4, provides for the vacuum cells of FIGS. 1-3B. At 401 and prior to cell assembly, contacts can be bonded to what are to be the ambient-facing surfaces of the walls. The contacts can be of silicon; in some embodiments, the silicon is doped to increase conductivity. Anodic bonding or other form of contact bonding can be used to bond the silicon contacts to the glass walls. In the illustrated embodiment, the contacts are eventually used to make electrical connections to the electric-field controller. In other embodiments, a sacrificial structure is bonded at this point, and removed later to make way for the contacts to be used during vacuum cell operation. Other embodiments omit action 401.

At 402, material is removed from the (to be) vacuum facing surface of the wall to form trenches and via holes. The trenches and via holes can be formed by a single-sided machining or etching operation that creates a ramped trench feature of increasing depth until penetrating an ambient-facing surface of the wall into a conductive material of a contact or sacrificial layer. Thus, in some embodiments, the via holes penetrate, i.e., extend into the contacts to ensure a reliable electrical connection. The via holes can extend through the wall from the bottom of the trenches or from the vacuum-facing surfaces in regions adjacent to the vacuum-facing surfaces. In some embodiments, the vias are formed, but trenches are not.

At 403, the trenches and via holes are plated with conductive metal, e.g., platinum, to define electrodes and vias. The vias can be hollow. The electrodes and vias are either even with or recessed from the vacuum-facing surfaces; in other words, the electrodes and vias are not proud of the vacuum-facing surface and thus do not interfere with subsequent bonding of walls and other components to the vacuum-facing surfaces. In some embodiments, portions of an electrode extending above a trench are polished down until they are flush with the top of the trench. In some embodiments, trenches are not formed, and the electrodes are plated on the vacuum-facing surfaces of the walls.

At 404, the cells are assembled and, in some cases, hermetically sealed; in other cases, an opening or port is available, e.g., for introducing and/or evacuating atoms. In some embodiments, this assembly can involve anodically bonding or otherwise contact bonding walls to each other. Since the electrodes are not proud of the vacuum-facing surfaces, they do not interfere with the bonding of walls even if the bonds extend over the electrodes.

At 405, the contacts are connected to the electric-field controller so that the controller can control/regulate electric field strengths and gradients throughout a target region of the cell bounded by the electrodes. If, as shown in FIG. 1, there are electrodes at each corner of a cube or other rectangular parallelepiped, full three-dimensional control of the electric field strengths and gradients within the bounded region can be attained.

At 406, quantum particles, e.g., cesium atoms, are introduced to the target region; they may be introduced from a reservoir in the cell to the target region or to the target region directly from a source outside the cell. At 407, a quantum system is operated with quantum particles in the vacuum cell and within a volume bounded by the electrodes. While the illustrated embodiment involves cold atoms, other embodiments include polyatomic molecules and atomic and molecular ions. While the illustrated embodiment involves quantum computing, other embodiments involve other quantum applications, such as quantum networking, quantum sensing, quantum positioning, and quantum signal processing.

At 408, once and or while the quantum system is operating, the distribution of electric field strengths and gradients within the vacuum cell are characterized. This can be a one-shot calibration or an ongoing process involving monitoring the electric field distribution. At 409, the electric field controller controls/regulates electric field strength and gradient distributions based on characterizations of the electric field distribution in the target region of the vacuum cell. In some embodiments, the monitoring and control/regulation is an iterated or continuous process, as indicated by the arrow from action 409 to action 408. The electric-field control can be used to cancel stray fields and/or to configure the register by using electric fields to implement Stark shifts to change the response of atoms to laser frequencies; for example, the electric field can cause a Stark shift; the Stark shift can change the transition an atom undergoes in response to laser light of a given frequency.

Figures 5A, 5B:
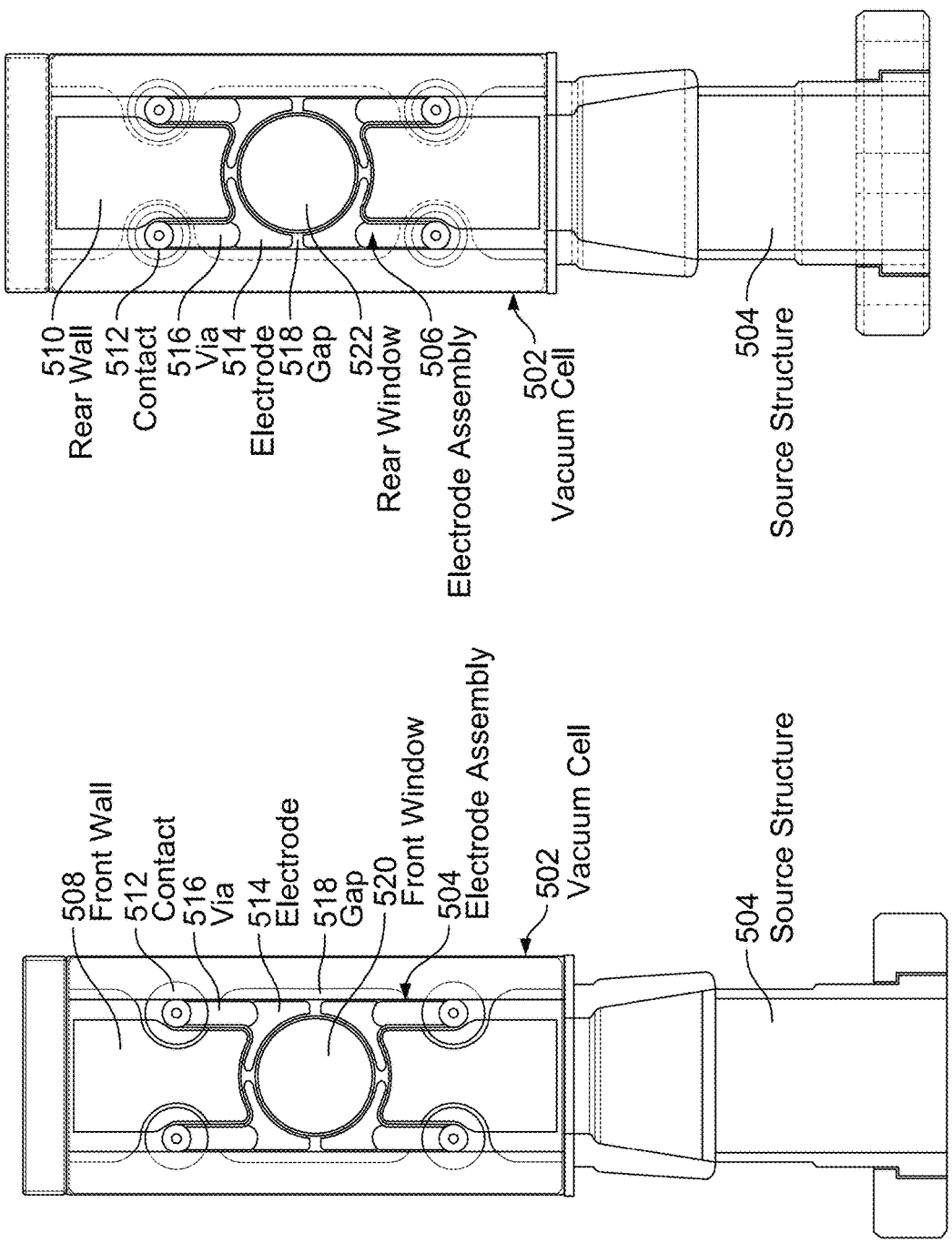
FIG. 5A is a gray-scale front elevation view of a vacuum cell assembly.
FIG. 5B is a rear elevation view of the vacuum cell assembly of FIG. 5A.

As shown in FIGS. 5A and 5B, a vacuum-cell assembly 500 includes a vacuum cell 502 supported by a source structure 504 that supplies cold neutral atoms to vacuum cell 502. Vacuum cell 502 includes eight electrode assemblies 506, four integrated with a front wall 508 as shown in FIG. 5A, and four integrated with a rear wall 510, as shown in FIG. 5B. Each electrode assembly includes an electrode 512 formed and contained in a trench in a vacuum facing surface of the front or rear wall, a contact 514 bonded to an ambient-facing surface of the front or the rear wall, and a via 516 connecting the respective electrode to the respective contact. As indicated in FIGS. 5A and 5B, the vias extend into respective contacts to ensure secure electrical connections. Gaps 518, which are parts of the walls, electrically isolate electrodes 514 from each other.

The four electrodes 512 on front wall 508 collectively define a circular area on the vacuum-facing surface of wall 508, that when projected orthogonal to the page and through wall 512 defines an unoccluded window 520. Optical window 520 provides optical access to the cell interior from the cell exterior. Electrodes on the rear wall similarly define a rear window 522 into the cell interior. The two windows 520 and 522 cap a cylindrical volume that contains a target region at which electrical field distributions are to be controlled. For example, the target region can include a qubit register. Note that the vias 516 and contacts 512 are further away from the respective windows 508 and 510 than are the electrodes to minimize any effects of the vias and contacts on the electric fields in the target region.

Figure 7B:
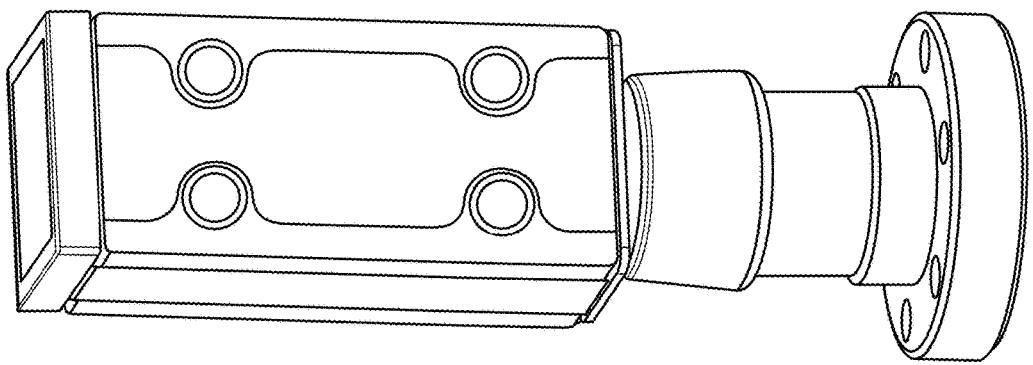
FIG. 7B is another perspective view of the vacuum-cell assembly of FIG. 5A.
Figure 7A:
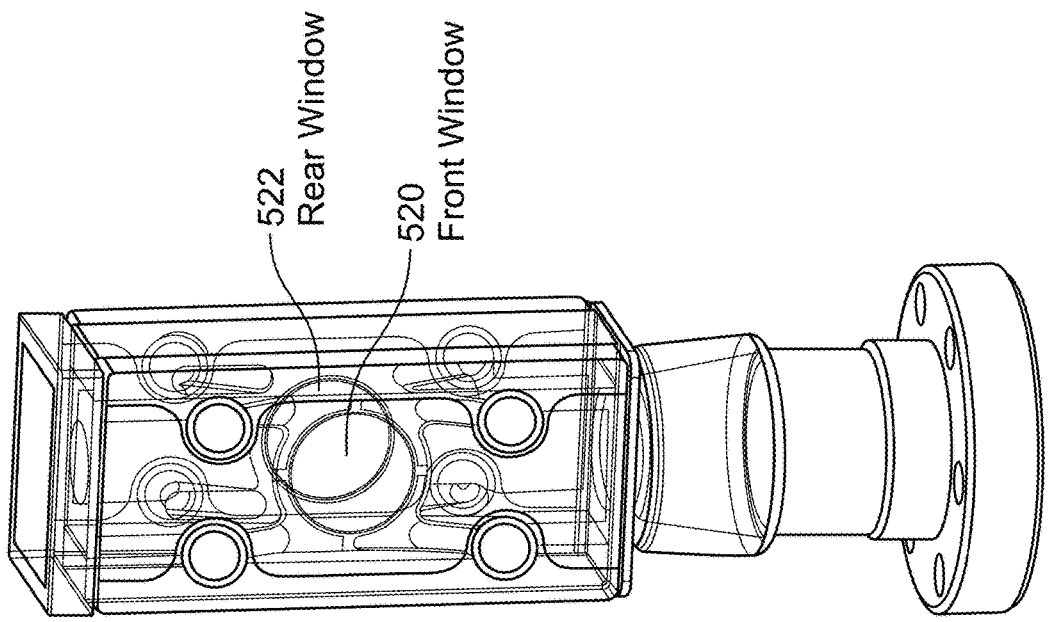
FIG. 7A is a gray-scale perspective view of the vacuum cell assembly of FIG. 5A.

As shown in FIGS. 6A and 6B, each wall 508 and 510 has a vacuum-facing surface 530 and an ambient-facing surface 532. Since contacts 512 are further from respective windows 520 and 522 than are the electrodes, vias 516 extend along inclines 534 from electrodes 514 to contacts 512, as is apparent in FIGS. 6A and 6B. FIGS. 7A and 7B are perspective views of vacuum cell assembly 500. Front and rear windows 520 and 522 are aligned so that, for example, absorption spectra resulting from illumination through the front window can be detected as the light exits the rear window.

In an embodiment, electrodes are directly plated to the inside surfaces of walls of an assembled cell. However, this can be difficult as evaporation or plating (outside of chemical vapor deposition (CVD) and similar non-line-of-sight (non-LOS) processes) is line of sight, requiring difficult masking at sheer angles with a complex motion to plate an inside surface uniformly and thoroughly. Some embodiments stretch out a filament or filaments with a thin long support bar so the wires or elements can be installed temporarily within the partially enclosed cell walls to evaporate, plate, sputter, etc. onto the inner surfaces. A similar process is executed for non-evaporable getter (NEG) coatings in ring colliders and can be done with almost any sputter, evaporation, or targeted beam coating technology.

Since it can be difficult to form the electrodes in an assembled cell, the illustrated embodiments perform plating on the walls before the walls are assembled to form the cell. These embodiments use a type of trenched field plate nominally recessed from the bonding surface in a manner that facilitates compact, complex plate and cell geometries while minimally complicating assembly. When the walls are assembled via bonding schemes such as transient liquid phase (TLP), anodic, contact, or other type of bonding, the electrode itself survives the subsequent bonding steps and minimally interferes or complicates the bonding schemes.

In the illustrated embodiments, trenches are recessed regions of cell walls that exist at least in part, from the active area of the field plate itself to the electrical feedthrough or electric potential generating element. Without such a recess, in at least some critical regions near a bond seam or cell wall joint, a standard plating would typically be proud of the base plane, even if only by a few hundred nanometers for typical evaporations. With the tight conformity requirements of direct bonding such as anodic bonding or other form of contact bonding, a raised step of the coating may prevent hermetic sealing even with a large gradient or feathered plating making a smooth transition in thickness.

By forming a trench and then plating into the trench, relatively thick plating can be deposited without interfering with bonding; this allows for plating to go right up to or even slightly overrunning the bond perimeter without preventing hermetic sealing. Thus, where a few hundred microns to a millimeter of spacing may have been required between a bond seam and a field plate to ensure bondability, now zero spacing may be achieved. This loosening of the tolerances for parts provides for extremely compact vacuum-cell designs.

A trench is relatively simple to fabricate through subtractive grinding, masked etching similar to MEMS processes, rastered etching or ablation such as with pulsed lasers or laser assisted etching, ultrasonic machining, melted displacement, erosion, molding, and other means. Other methods of material removal may be ion or plasma etching, ultrasonic milling/sinking, grinding, local thermal reflow/stamp displacement, laser machining or ablation, and even additive methods such as growing or sputtering the negative of the trench. Further, in most designs, a single-sided machining/forming operation suffices for making scalable fabrication easier. What matters is the top/bonding plate is uninterrupted by any protrusions. This means a chemical etch of one micron (1 um) deep is more than enough to accommodate most practical evaporation or sputter plating.

A further advantage of plating within a trench is that the recessed nature of the resulting plating helps prevent damage to the conductive plate, especially if it is fairly thin or has narrow or high-density traces that might otherwise be easily broken or shorted. Deeper trenches would further act as shadow masks if conductive species such as alkali metals are intentionally injected into a chamber that has trenched platings. For relatively high vapor pressure species such as rubidium, it would be wise to have a getter in the chamber to prevent eventual migration and condensation by background thermal means.

Vacuum chamber walls can be subject to deflection due to the pressure differential between interior and exterior of the vacuum cell. This deflection can cause optical distortion on beams passing through optically transparent chamber walls. Trench profile and location can help to alleviate this in several ways. In an embodiment, where a trench would cause higher order or less desirable aberration by removing material, the trench depth can be modulated to maintain stiffness in some regions while adding more flex in other regions. In an embodiment where material removal would be problematic for the overall deflection or structural integrity, the trench can be as little as a few hundred nanometers (nm) deep and have smooth etch profiles achieved with post machining etching. In the illustrated embodiments, the trench profile is made sufficiently deep and circularly symmetric about a window to minimize distortion through the window; any increased aberration away from the window is of little concern since the wall away from the window is not used for laser beam transmission.

Other embodiments use direct bonding reinforcers such as thicker window addons or perimeter rings to flatten and/or make such windows locally more rigid. Such bonding can be implemented by anodic or other form of contact bonding, or hydroxide bonding. In some embodiments, such reinforcements can serve as mounting platforms for internal or external optics, alignment keys or tools, or may themselves serve purposes such as light absorbers or a surface or structural support for a getter material near the most sensitive part of the cell.

Some embodiments establish a passive grounded conducting plane through as much of the cell as possible to collect and disperse errant charges that would otherwise build up. The passive grounded conducting plane can be in addition to or in-lieu of active field plates. While field plates and the feedthroughs connecting them to the outside world may exhibit impedances up to mega-ohms, as they simply must facilitate a desired charge in an area, grounded planes require higher uniform conductivities throughout the cell to ensure charge gradients do not build. Further, where field plates need to be switched quickly or operated as AC fields, high conductance/low impedances are required across the plate and connecting feedthrough.

In embodiments, impedances are tailored not only through geometry and thickness of the conductive plating but are also controlled with parallel conductors with small insulating gaps or even multi-stack laminate plating with insulating layers such as silicon dioxide ($SiO_2$) or other dielectrics. Such layers are especially useful for helping to establish waveguides, shielded wires to minimize interference and cross talk, and running radio frequency (RF) coaxial "cables". Layered conductors and insulators, especially with at least one being optically transparent, are used to make integrated optical modulators such as spatial light modulators, liquid-crystal-like modulators, electro-optical and acousto-optical modulators integrated into windows, waveguides, and feedthroughs.

Depending on the embodiment, electrodes and vias can be of highly conductive metals such as gold, silver, platinum, palladium, copper, or stainless steel. The material choice may be dictated not only by the desired conductivity but chemical reactivity: for example, alkali metals can adversely attack metals like gold, while copper can oxidize when subjected to elevated temperatures. Modifications to the assembly/fabrication process such as with inert gases, vacuum purging, or thin passivation layers with noble, low-reactivity metals, such as platinum, can be used to protect against harmful chemical interactions.

Various dielectrics can be chosen as insulators such as $SiO_2$, SiN, and others. More interestingly, indium-tin-oxide (ITO) and other transparent conducting oxides can be used to establish conductivity while also allowing optical access through the conductor, where metals would otherwise occlude the clear optical path. Alternatively, clever use of field plates put down on sufficiently polished surfaces may turn a field plate (e.g., electrode) into a beam reflector folding the optical path in an advantageous way where the plate would have otherwise prevented optical access. Insulative layers can likewise also exist as polarization elements or platings to the backside of such elements.

More exotic materials such as sapphire, photorefractive crystals, or other optically active or interesting materials may be used and integrated into the assemblies. They may be grown, deposited, bonded, laminated, coated, or even comprise the bulk of the window material. These exotic materials may enable more integrated electro-optical systems for faster on-board or in-cell control, feedback, and interfacing.

One of the biggest strengths of this technology is the ability to form a simplistic vacuum electrical feedthrough by tapering the trench down, generally away from the field plates, until the backside/ambient side of the substrate is breached. Ideally this taper terminates at a hole with a perfectly sharp edge such that a single top-down line-of-sight metallization or plating forms a continuous conductive path from the field plate down to the conductor used to seal the backside breach. However, most machining operations or even post machining handling can result in some breakout or chipping which may prevent a continuous line-of-sight ramp down to the backside.

Therefore, some embodiments pre-bond a conductor or sacrificial support material to where the trench should breach to enable plating up to and on the conductor. One method of achieving this on a Pyrex® window is to bond small pads of thin high conductivity silicon to the backside of the glass at the breach point. The machining/etching can then go at least 1 μm (though preferably not more than 100 μm) into the silicon, breaching its native oxide so that the conductive plating makes good electrical contact to the silicon. Silicon conductive pads as thin as a couple hundred microns can seal holes as small as a few tens of microns so as to allow for low current high potential driving of the electric field plate. Subsequent plating, with or without trenching may be deposited onto the backside of the feedthrough window to run out to a location where electrical mechanical contacts may be bonded to interface with an electrical driving system.

Combining materials such as ITO and $SiO_2$ with MEMS fabrication techniques, depositions, and post polishing, one can etch trenches of depths slightly less than the intended ITO and $SIO_2$ stack up layer to be deposited/grown to completely fill in the trench. The excess is then polished down to the original base plane (so the electrodes are flush with the walls) thereby having a completely uninterrupted surface for bonding or optics that still has patterned conductive traces. Over such an uninterrupted surface high precision bonding practices such as contact, silicate, TLP, or hydroxide bonding can be used to achieve hermetic seals and allow the traces to continue to the ambient side of the cell for electrical connection.

Electrodes can also be formed from a single deposition operation of a transparent conductive oxide (TCO), such as ITO. The deposition can be performed with a masked patterning or etching scheme. The conductive oxide can be less than 400 nm thick and the materials and geometries used are sufficiently compliant, especially when feathered or tapered to avoid abrupt patterned edge boundaries. This allows for direct bonding (e.g., anodic, contact, hydroxide, etc.) over the patterned electrodes such that a hermetic seal is still effectively formed. As long as the TCO individual "traces" or plates are continuous from the vacuum side through the bond interface to the ambient side, even if just exposed on a thin edge along the ambient bond seam, then an effective electrical feedthrough or array of feedthroughs is established.

Another scheme involves the uniform or near uniform (partially patterned) coating of a TCO onto a single side plate especially if the plate had minor chamfers or beveled edges of, for example, 10-500 μm. In that example, the TCO continuously transitions from the flat bonding plane to the beveled edges. Then, before or after bonding to the sidewalls or rest of the chamber, the transparent plate with transparent TCO gets a surface modification or treatment to locally anneal or degrade the conductivity of the TCO. This degradation is performed so as to avoid significantly changing the TCO's structural properties such as thickness or surface polish, effectively writing a pattern into the conductor electrically but leaving it mechanically minimally modified to enable hermetic bonding to said surface. In this manner the individual traces/electrodes are connected by higher resistivity regions meaning that to establish a bias between adjacent effective "electric field plates" or regions, a constant current will need to flow between said plates or regions through the higher resistivity boundaries electrically "written" or patterned into the TCO.

Depending on the embodiment, the integrated devices can include field-modulated waveplates or cavity tuning windows/mirrors/gratings utilizing layered transparent conductors and insulators. Tunable anti-reflective (AR) and highly reflective (HR) coatings can be applied via heat, electrostatics, or other electrical transduced effects. Traces can be imbedded and bonded to discrete or monolithically imbedded integrated circuits (ICs), semiconductor devices, mechanical actuators, transducers, antennae, optical or RF focusing elements, metamaterials, or analogs of such components or even entire sets including systems of such components.

Depending on the embodiment, such structures as mentioned previously can also be fabricated by subtractive or additive processes. Applicable additive processes include deposition, plating, sputtering, CVD, growth, self-assembly processes, and 3D printing. The resulting structures can then polished down to affect a uniform hermetic seal. Further, deposited or grown materials can be in part or fully converted in their entirety or in masked patterns such as from silicon to $SiO_2$ turning a semiconductor into an insulator making seamless monolithic integrated components and traces. Such conversion results in changes in material expansion and so typically works best with thin films and requires repolishing prior to bonding. Further, ion implantation can be effected to alter conductivity in rastered or masked patterns as well for integrated conduction paths or as a means of hardening to or accelerating etching processes.

Herein, a "vacuum cell" is an enclosure that divides an environment into a vacuum-cell interior and a vacuum-cell exterior. Herein, the vacuum-cell exterior is referred to as an "ambient". The enclosure may be complete, or it may have ports that allow fluid communication with connected chambers, e.g., source and pre-cooling chambers. A vacuum cell may be separated from connected chambers by a small aperture or other means to maintain a pressure differential, allowing a connected chamber to operate at a higher pressure (weaker vacuum) than the vacuum cell.

In the illustrated embodiments, each vacuum cell includes a pair of flat walls that host electrode assemblies. Other embodiments have more than two walls that host electrode assemblies. Still other embodiments have only one wall that hosts electrode assemblies; for example, the wall may be cylindrical or spherical so as to host electrode assemblies on opposing sides of a register region.

In all cases, each wall of a vacuum cell has an interior vacuum-facing surface and an ambient-facing surface. However, before the walls are assembled to form the vacuum cell, both surfaces may be facing an ambient. However, prior to assembly, the surface that will be vacuum-facing once the cell is assembled and the vacuum is established may be referred to herein as the "vacuum-facing surface" and the opposing surface of the same wall is referred to as the "ambient-facing surface".

The requirement for electric-field control is apparent with ions as they inherently interact with electric fields due to their non-zero net charges. Neutral atoms, in their ground and low-level excitation states, react at most weakly to electric fields. Since they have zero net charge, the neutral atoms can be packed closely together without interacting. However, neutral atoms do interact with electric fields in several situations that can occur during preparation or operation. For example, to cause them to interact, neutral atoms can be transitioned to highly excited Rydberg states. An atom in a Rydberg state has a large dipole moment and, thus, can interact strongly with electric fields. Such interactions can cause neutral atoms in quantum computing to decohere so that the information they represent is lost. Within the UHV cell, electric fields must be limited or else carefully controlled so they do not interfere with intended functioning.

Herein, the terms "electrode" and "electric-field plate" and variants thereof are used interchangeably and refer to the same structures. Herein, a "spectrographic system" is a type of imaging system that yields spectrographic characterizations, e.g., of atoms. However, a "spectrographic system" can serve imaging functions other than producing spectrographic characterizations.

Herein, "quantum particle" refers to particles that can have superposition states suitable for representing quantum values. These would include neutral and charged atoms and molecules, although the focus herein is on neutral alkali metal and alkaline earth metal atoms. More specifically, the quantum particles can be cesium, while rubidium can be the most suitable alternative.

Herein, a "rectangular parallelepiped" is a three-dimensional geometric figure with six rectangular sides. As the terms are used herein, "rectangle" encompasses, in the limit, squares and "rectangular parallelepiped" encompasses, in the limit, cubes. Three or more objects, e.g., electrodes are "non-colinear" if there is no straight line that intersects all of the electrodes. Three non-colinear points define a plane (i.e., the three points are "coplanar"); the three non-colinear points can be selected from three non-colinear electrodes to define a plane. In the illustrated embodiment, each of two walls includes four coplanar electrodes. Two sets of coplanar electrodes can define planes that are parallel to each other; however, the invention also provides for non-parallel planes of electrodes as long as the planes do not intersect within the vacuum (though the planes may intersect within the ambient outside a vacuum cell.

Herein, all art labeled "prior art", if any, is admitted prior art; all art not labelled "prior art", if any, is not admitted prior art. The illustrated embodiments, variations thereupon and modifications thereto are provided for by the present invention, the scope of which is defined by the following claims.

What is claimed is:

1. A system comprising a vacuum cell including:
   a boundary structure separating an internal ultra-high vacuum (UHV) from an ambient, the boundary structure including a window set of at least one window, the window set providing optical access between the ambient and the UHV; and
   at least six electrode assemblies, the electrode assemblies including respective vacuum-facing electrodes, respective contacts, and respective vias electrically connecting respective electrodes with the respective contacts through the boundary structure, the electrode assemblies including:
      a first electrode set of at least three non-colinear electrodes defining a first plane; and
      a second electrode set of at least three non-colinear electrodes defining a second plane, the second plane not intersecting the first plane within the UHV.

2. The system of claim 1, wherein the window set provides optical access to a target region through the first plane and through the second plane, the target region being within the UHV.

3. The system of claim 1, wherein the vacuum cell includes at least eight electrode assemblies arranged at eight corners of a rectangular parallelepiped with a volume less than 100 milliliters (mL).

4. The system of claim 1, wherein the boundary structure includes first and second walls, each of the first and second walls hosting at least three of the electrode assemblies.

5. The system of claim 4, wherein at least one vacuum-facing electrode is disposed within a respective trench formed in a respective wall so that the vacuum-facing electrode is flush or recessed with respect to adjacent areas of a vacuum-facing surface of the respective wall.

6. The system of claim 5, wherein each trench further slopes through the boundary structure to form a respective via hole terminating into a respective contact of the respective contacts without breaching a hermetic seal formed by the respective contact, the respective via being located in the respective via hole.

7. The system of claim 1, wherein at least one via extends from a respective electrode of the respective electrodes through an ambient-facing surface of a respective wall and into a respective contact of the respective contacts.

8. The system of claim 1, wherein the vacuum cell includes at least eight electrode assemblies.

9. The system of claim 8, wherein the at least eight electrode assemblies are arranged at eight corners of a rectangular parallelepiped.

10. A vacuum-cell process comprising:
    removing wall material to define via holes through walls having respective vacuum-facing surfaces that are to face a vacuum within a vacuum cell and having respective ambient-facing surfaces that are to face an ambient for the vacuum cell;
    fabricating electrode assemblies, each electrode assembly including
       a respective electrode located in or on the respective vacuum-facing surface,
       a respective contact bonded to the respective ambient-facing surface, and
       a respective via disposed within the respective via hole, the respective via extending from the respective electrode through the respective wall to contact the respective contact; and
    forming the vacuum cell, the forming including bonding the walls and evacuating the vacuum cell to achieve an ultra-high vacuum (UHV).

11. The vacuum-cell process of claim 10, wherein the respective contact is formed by bonding to, locally doping of, depositing/plating onto, or locally growing upon the respective ambient-facing surface.

12. The vacuum-cell process of claim 10, further comprising, before the fabricating, forming trenches in the respective vacuum-facing surfaces, the fabricating including forming the respective electrode so that the respective electrode is contained by each of the trenches.

13. The vacuum-cell process of claim 10, wherein the fabricating includes fabricating the respective via so that the respective via protrudes through the respective ambient-facing surface and into the respective contact.

14. The vacuum-cell process of claim 13, wherein the fabricating results in at least four electrode assemblies formed on each of two walls.

15. The vacuum-cell process of claim 13, wherein the fabricating results in eight electrodes arranged at vertices of a rectangular parallelepiped, the rectangular parallelepiped having a volume of less than 100 milliliters.

16. A vacuum cell comprising:
    a boundary structure separating an internal ultra-high vacuum (UHV) from an ambient, the boundary structure including a window set of at least one window, the window set providing optical access between the ambient and the UHV; and
    at least six electrode assemblies, the electrode assemblies including respective vacuum-facing electrodes, respective contacts, and respective vias electrically connecting respective electrodes with the respective contacts through the boundary structure, the electrode assemblies including:
       a first electrode set of at least three non-colinear electrodes defining a first plane; and a second electrode set of at least three non-colinear electrodes defining a second plane, the second plane not intersecting the first plane within the UHV.

17. The vacuum cell of claim 16, wherein the window set provides optical access to a target region through the first plane and through the second plane, the target region being within the UHV.

18. The vacuum cell of claim 16, wherein the vacuum cell includes at least eight electrode assemblies arranged at eight corners of a rectangular parallelepiped with a volume less than 100 milliliters (mL).

19. The vacuum cell of claim 16, wherein the boundary structure includes first and second walls, each of the first and second walls hosting at least three of the electrode assemblies.

20. The vacuum cell of claim 19, wherein at least one vacuum-facing electrode is disposed within a respective trench formed in the respective wall so that the vacuum-facing electrode is flush or recessed with respect to adjacent areas of a vacuum-facing surface of the respective wall.

21. The vacuum cell of claim 20, wherein each trench further slopes through the boundary structure to form a respective via hole terminating into a respective contact of the respective contacts without breaching a hermetic seal formed by the respective contact, the respective via being located in the respective via hole.

22. The vacuum cell of claim 16, wherein at least one via extends from a respective electrode of the respective electrodes through an ambient-facing surface of a respective wall and into a respective contact of the respective contacts.

23. The vacuum cell of claim 16, wherein the vacuum cell includes at least eight electrode assemblies.

24. The vacuum cell of claim 23, wherein the at least eight electrode assemblies are arranged at eight corners of a rectangular parallelepiped.

* * * * *